Patented Jan. 6, 1925.

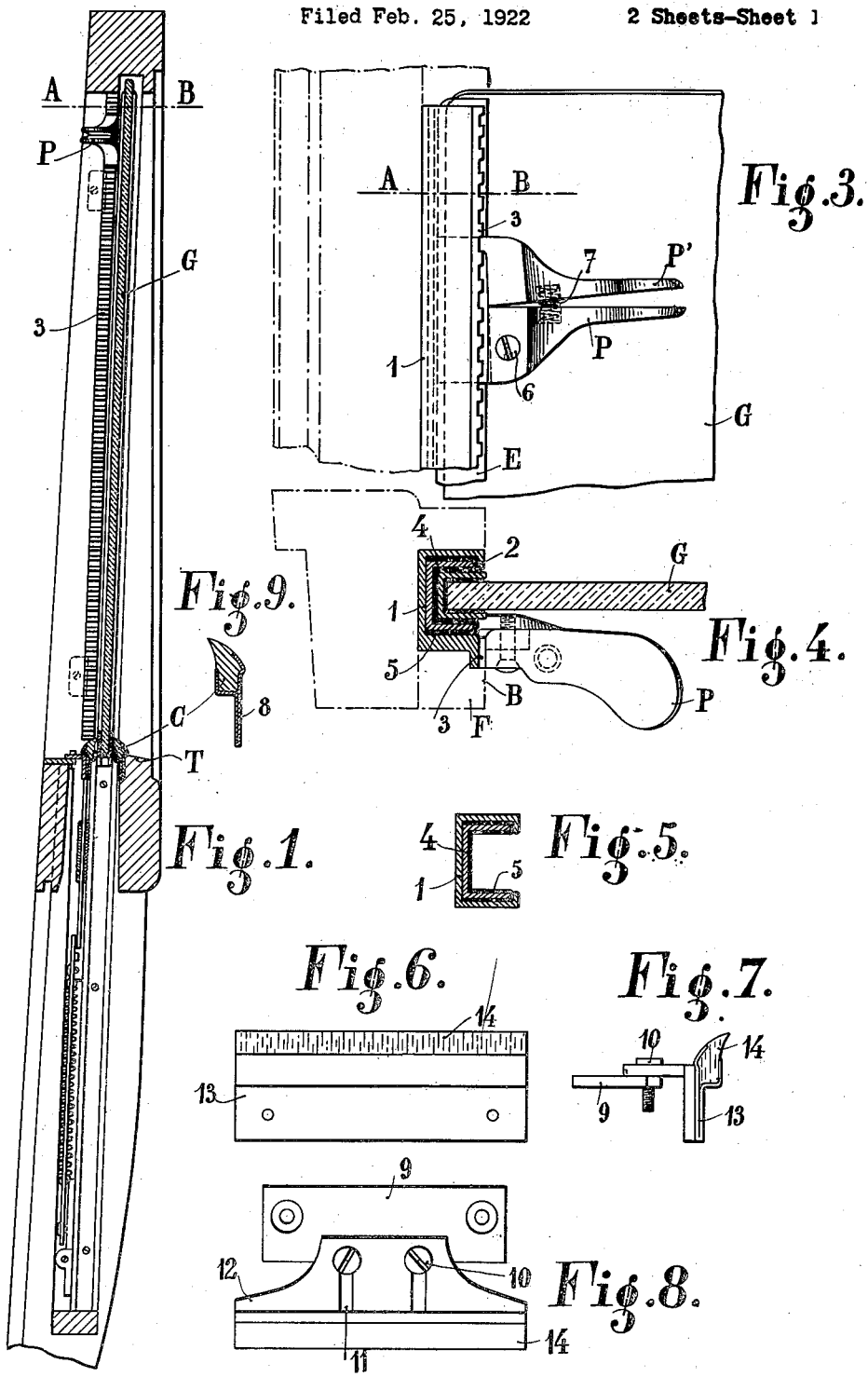

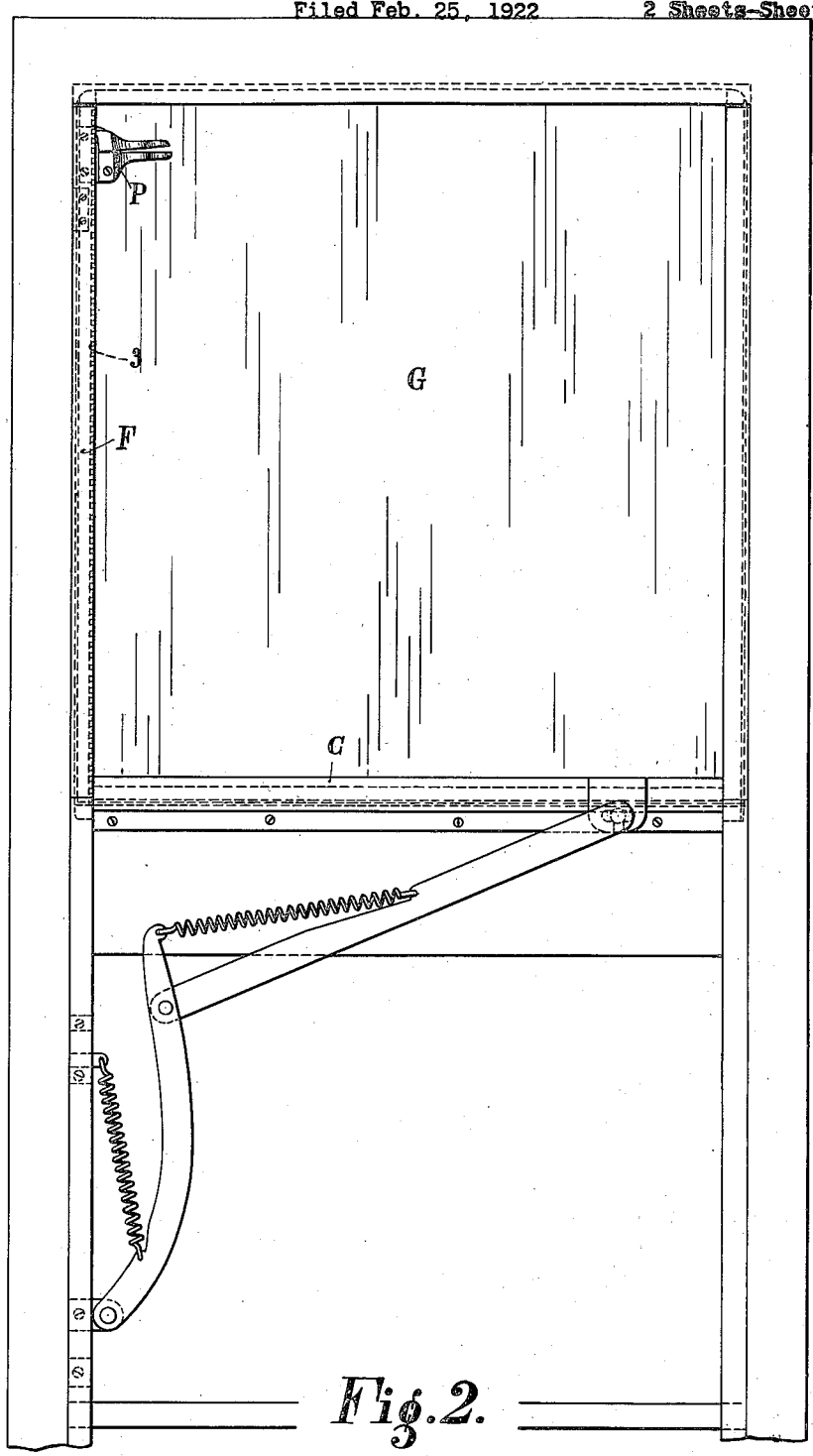

1,522,183

UNITED STATES PATENT OFFICE.

GEORGES HAARNAGELL, OF PARIS, FRANCE.

SLIDING WINDOW FOR VEHICLE DOORS.

Application filed February 25, 1922. Serial No. 539,148.

*To all whom it may concern:*

Be it known that I, GEORGES HAARNAGELL, a citizen of France, and a resident of Paris, Department of Seine, France, have invented some new and useful Improvements in Sliding Windows for Vehicle Doors, of which the following is a specification.

The main object of the invention is to provide a coach door wherein the glass square is guided in a way absolutely excluding any vibration of the same, means being provided to permit easy fixing of the glass in any desired position of the same.

I attain these objects by providing grooves in the door frame for the glass squares, said grooves being trimmed with soft material, preferably velvet, along the edges of the glass, said means excluding, together with suitable rubber trimming provided on the crossbars, any vibration of the glass. In order to fix the latter in any desired position of the same, a toothed rack is provided along the one border of the aperture for the glass, and a toothed lever is arranged pivotally on the glass, the said lever engaging normally by action of a spring into the teeth of said rack and permitting upon being depressed, the adjustment of the glass to any desired height. The pivot for the said lever is provided preferably on a second lever fixed to the glass and supporting the said spring.

An executional mode of the invention is shown in the accompanying drawings.

Fig. 1 shows a vertical section of the door;
Fig. 2 shows the door from the inside;
Fig. 3 shows, on a larger scale, the rack and the fixing lever;
Fig. 4 is a section to lines A—B of Figs. 1 and 3;
Fig. 5 is a section similar to the foregoing section but taken on the side opposite to the rack side;
The Figs. 6, 7 and 8 show, in different views additional means consisting in a pressure cushion for intermediate glasses or for glasses of larger dimensions.
Fig. 9 is a view of a detail.

Referring to Figs. 1, 3 and 4, the coach door is provided with a groove F and into said groove is fixed a guide 1 profiled in such a way that it presents a wing 2 projecting a little outwardly; to this projection a toothed rack 3 is attached.

In the guide 1 is adjusted and may be equally fixed a second guide 4 with its inner side entirely covered by velvet 5 or the like, this velvet forming upon its whole length a cushion, wherein slides with the sufficient degree of friction the frame E of the glass square G. Similar guides not provided with racks are disposed in a guide in the opposite side of the door, said guides being shown in Fig. 5. The lower part of the door is also provided with grooves fitted with velvets, in a way that the glass square is conveniently guided along its whole trajectory. The teeth of the rack do not project from the border B of the groove F and said teeth are inclined upwardly, which is of importance to secure a proper engagement of the knob of the catches P fixed upon the frame E of the glass square.

These catches are formed of two parts P and P'', the part P being fixed upon one side of the frame E of the glass, the said frame being of channel formation as clearly shown in Figure 4. The part P' is movable around a pivot 6 and tends continuously to engage the rack 3 by the action of the spring 7 interposed between the levers of the catches.

It will be noted that the parts P and P' are substantially parallel with the glass and are at one side thereof where they can be conveniently reached and actuated.

The catches are, as shown in Fig. 3, entirely freed from the groove, their engagement with the rack being very efficient because the inclination of the teeth prevents the tooth of the member P' from becoming casually disengaged from its retaining rack and to scratch the rack in case of disengagement occasioned by the weight of the glass and by vibrations or the like.

It will be understood, that in order to completely lower the glass or to arrange the same in an intermediate position it will suffice to act upon the movable part P' of the catch to uncouple its tooth from the rack. (The opening and the closing of the glass may be effected easily, without appreciable effort, and with two or three fingers, because, the invention is destined to be used particularly in combination with the U. S. A. Patent No. 1,305,356.) This device is shown anew in Fig. 2 though without necessity for understanding of the function of the parts forming subject matter of the present invention.

In order to avoid the vibrations of the glass during the movement of the vehicle and to increase the guidance of the glass square during its displacements, the border of the crossbar T of the centre of the door is provided with a tongue C of rubber, (more especially to be used for glasses of large dimensions, intermediate glasses of auto vehicles, of tramways and the like. In such case two such tongues or a plurality of them may be employed.)

The tongue C is arranged, as shown in Fig. 9 in a groove 8 and extends over the whole width of the glass square.

According to Figs. 6-8 a press-cushion is shown in them destined to replace the tongue C especially in case of glasses of large dimensions, intermediate glasses of auto vehicles, of tramways and the like. In such case two tongues or a plurality of them may be employed.

This press cushion consists of a bar 9 upon which is fixed adjustably, by means of screws 10 and guides 11, an angle piece 12 supporting in a groove 13 a cushion 14 of india rubber chamfered to the shape of a knob in order to ensure a perfect contact with the glass.

Having now described the nature of my invention, what I claim, is:

A vehicle door having a window opening, channel guides in opposite sides of said opening, one of said guides being provided on one side with a rack bar the teeth of which overlie the outer edge thereof, a glass pane having a frame forming a channel member on one side edge of the glass and arranged to operate in the said guide member, and a catch comprising a relatively fixed member secured directly to one side of the said frame, said fixed member being arranged substantially parallel with the glass, a second member pivotally connected to said relatively fixed member and having a tooth at its upper side to engage with any of the teeth of the rack to secure said glass in adjustable position, and a spring arranged between said members and active to normally hold the pivoted member in engaged position, said pivoted member being also arranged substantially parallel with the glass.

In witness whereof I affix my signature.

GEORGES HAARNAGELL.